United States Patent [19]

Mitsuhashi et al.

[11] Patent Number: 5,047,888
[45] Date of Patent: Sep. 10, 1991

[54] MAGNETIC SHEET CONTROL MEMBER

[75] Inventors: Daisuke Mitsuhashi; Shigeru Ando; Nishiyama Tomoyuki, all of Tokyo, Japan

[73] Assignee: Fuji Photo Film Co., Ltd., Kanagawa, Japan

[21] Appl. No.: 457,917

[22] Filed: Dec. 27, 1989

[30] Foreign Application Priority Data

Dec. 27, 1988 [JP] Japan .................. 63-327947
Dec. 28, 1988 [JP] Japan .................. 63-328939
Dec. 28, 1988 [JP] Japan .................. 63-328940
Jun. 9, 1989 [JP] Japan .................. 1-145443

[51] Int. Cl.$^5$ .......................................... G11B 15/60
[52] U.S. Cl. .............................. 360/130.34; 360/104; 360/129; 360/122
[58] Field of Search ................. 360/104, 129, 130.3, 360/130.34, 130.2, 122, 99.01

[56] References Cited

U.S. PATENT DOCUMENTS 4,420,782 12/1983 Argumedo et al. ......... 360/130.3 X
4,652,959 3/1987 Hamada ..................... 360/130.3
4,710,837 12/1987 Matsumoto ............... 360/130.34 X
4,945,436 7/1990 Nagashima ............... 360/130.2 X

FOREIGN PATENT DOCUMENTS 0219671 11/1985 Japan .
0009868 1/1986 Japan .
0033380 2/1987 Japan .
0032765 2/1988 Japan .................. 360/119
0042063 2/1988 Japan .................. 360/130.34

Primary Examiner—Robert S. Tupper
Assistant Examiner—Andrew L. Sniezek
Attorney, Agent, or Firm—Sughrue, Mion, Zinn Macpeak & Seas

[57] ABSTRACT

A magnetic sheet control member, for use in a device for recording and reproduction using a magnetic head in sliding contact with a rotary flexible magnetic sheet, to guide the magnetic sheet to the magnetic head by a negative pressure, having upstream-side and downstream-side inclined surfaces disposed respectively at the upstream side and the downstream side with respect to the rotation direction of the magnetic sheet and inclined to become more distant from the free rotary surface plane of the magnetic sheet towards the downstream side, and stabilizing surfaces disposed respectively at the outer side and inner side with respect to the radial direction of the magnetic sheet to connect the upstream-side inclined surface and the downstream-side inclined surface, thereby obtaining a stable head contact over the entire recording area from the innermost side to the outermost side of the magnetic sheet.

12 Claims, 12 Drawing Sheets

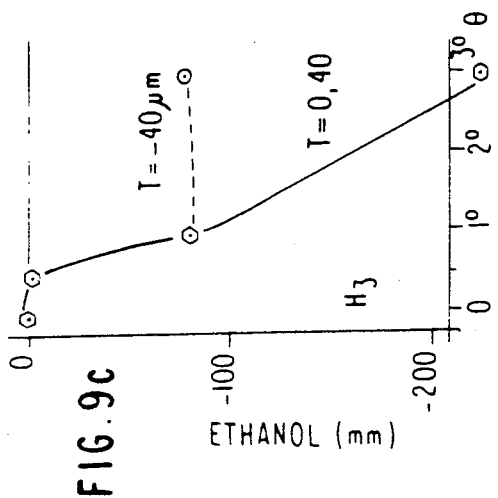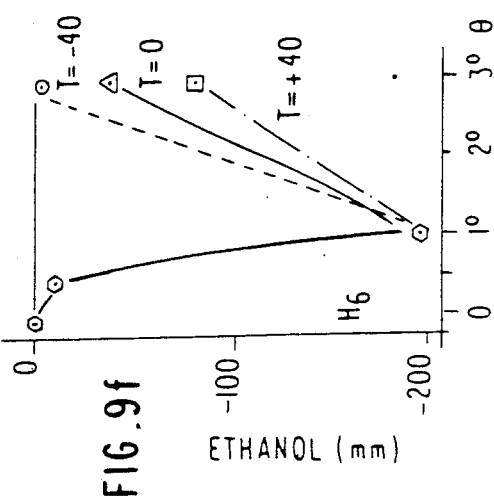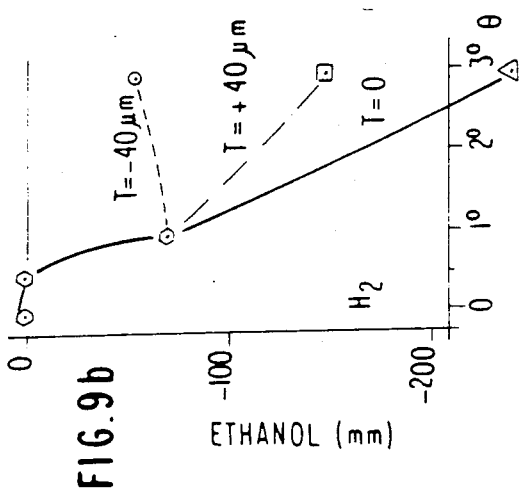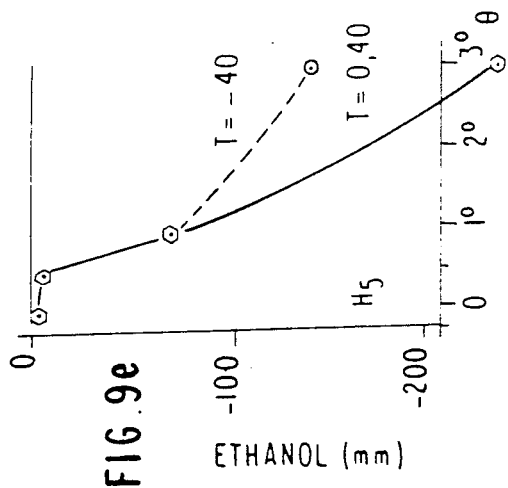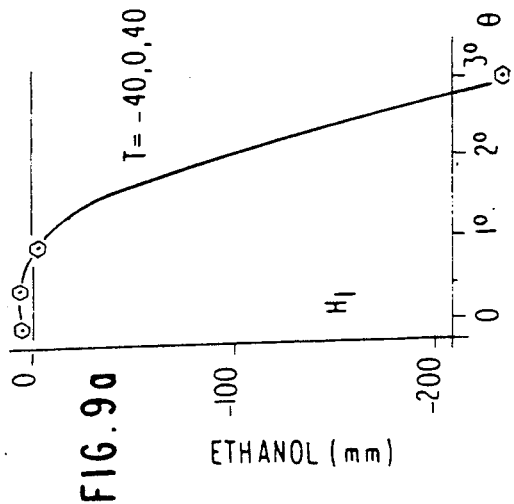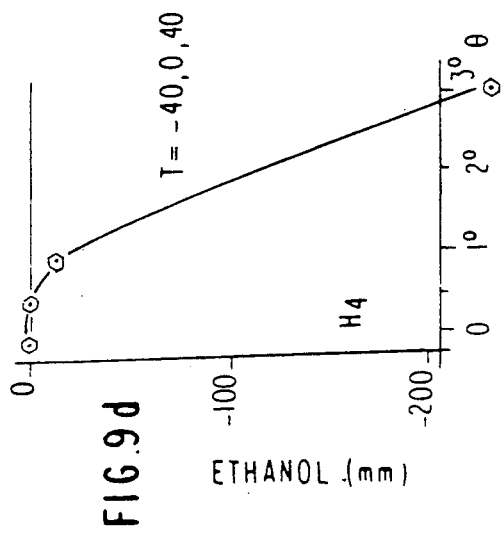

MAGNETIC SHEET CONTROL MEMBER

BACKGROUND OF THE INVENTION

1. Field of the Invention

This invention relates to a magnetic sheet control member which, in a magnetic sheet recording and reproduction device for recording and reproduction on a flexible magnetic sheet, is to maintain a good contact of a magnetic head with the magnetic sheet.

2. Description of the Related Art

In a recording and reproduction device which uses a flexible, thin magnetic sheet as a recording medium, when a magnetic head is merely caused to contact the magnetic sheet, the magnetic sheet tends to deflect due to the pressure of the magnetic head and come away from the magnetic head, and stable contact is not achieved.

Heretofore, there has been proposed, for example, in Japanese Patent Publication Laid-open No. 61-9868/1986 magnetic sheet control members disposed in the vicinity of a magnetic head to generate a negative pressure between the control members and a magnetic sheet, wherein the magnetic sheet is attracted by the negative pressure towards the magnetic head side, thereby obtaining a stable head contact. Specifically, as shown in FIG. 23, magnetic sheet control members 13 and 14 are disposed individually at the upstream and downstream sides of a magnetic head 11 with respect to the rotational direction (arrow R) of a magnetic sheet 12, the surfaces of the magnetic sheet control members 13 and 14 facing the magnetic sheet 12 being inclined in a direction that departs from the magnetic sheet 12 towards the downstream side, thereby generating a negative pressure in association with high-speed rotation of the magnetic sheet 12.

However, the prior art magnetic sheet control members 13 and 14 are separated from each other in order to permit the head 11 to be placed between them, the inner and outer spaces between these members are open. Thus, the negative pressure tends to escape through these openings. As a result, head contact on the tracks at the inside and outside of the magnetic sheet 12 tends to become unstable.

BRIEF SUMMARY OF THE INVENTION

With the aim of eliminating the prior art problems of magnetic sheet control members, it is a primary object of the present invention to provide magnetic sheet control members which enables consistently good head contact over the entire recording area from the innermost side to the outermost side of the magnetic sheet.

In accordance with the present invention which attains the above object, there are provided a magnetic sheet control member, for use in a device having a magnetic head in sliding contact with a rotary flexible magnetic sheet for magnetic recording and reproduction. The control member will guide the magnetic sheet to the magnetic head by a negative pressure. The member has a body with an upstream-side inclined surface and a downstream-side inclined surface individually disposed at the upstream side and the downstream side of the magnetic head with respect to the rotational direction of the magnetic sheet. The surfaces depart from the free rotary surface plane of the magnetic sheet towards the downstream side. The member also has stabilizing surfaces individually disposed at the outer periphery and the inner periphery of the magnetic head with respect to the radial direction of the magnetic sheet to connect the upstream-side inclined surface and the downstream-side inclined surface.

Thus, in the inventive magnetic sheet control member, the upstream-side inclined surface and the downstream-side inclined surface generate negative pressures between the individual surface and the magnetic sheet to attract the magnetic sheet. The outer and inner stabilizing surfaces prevent leakage of the negative pressures from the outer and inner edges of the inclined surfaces, thereby stabilizing attraction of the magnetic sheet.

Other and further objects, features and advantages of the invention will appear more fully from the following description.

BRIEF DESCRIPTION OF THE DRAWINGS

FIGS. 9(a), 9(b), 9(c), 9(d), 9(e) and 9(f) are graphs showing generation of negative pressures at the individual holes.

DETAILED DESCRIPTION OF THE INVENTION

Preferred embodiments of the present invention will now be described with reference to the drawings.

Figure 1:
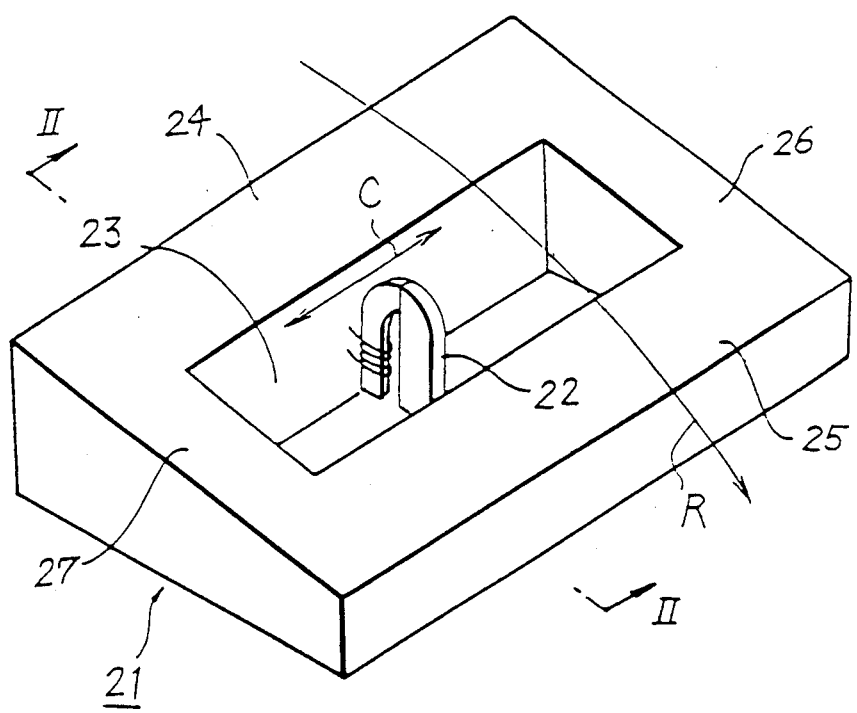
FIG. 1 is a schematic perspective view showing a first embodiment of the present invention.
Figure 2:
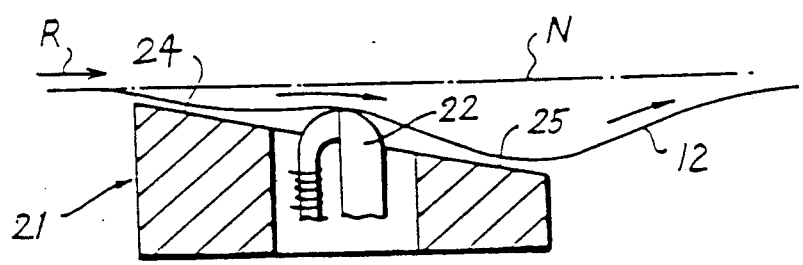
FIG. 2 is a schematic cross sectional view taken along line II—II in FIG. 1.

FIG. 1 and FIG. 2 show a first embodiment of the present invention. Referring to FIGS. 1 and 2, a control member 21 has a body with a rectangular plate form, at the center of which is provided a slot 23 in which a magnetic head 22 is located. The control member 21 is mounted on a frame of a magnetic sheet recording and reproduction device (not shown). The magnetic head 22 is inserted into the slot 23 and, within the slot 23, is moved in the radial direction (direction of arrow C) of a magnetic sheet (not shown) to change the recording track.

The surface of the control member 21 opposing the magnetic sheet is provided with inclined surfaces 24 and 25 at the upstream side and the downstream side, respectively, of the slot 23 with respect to the rotational direction (direction of arrow R) of the magnetic sheet. These inclined surfaces 24 and 25 are inclined in the direction to become more distant from a free rotary surface N of the magnetic sheet towards the downstream side with respect to the rotational direction of the magnetic sheet. The free rotary surface N of the magnetic sheet herein means a rotary surface when the magnetic sheet mounted on a spindle motor of the magnetic sheet recording and reproduction device is not applied with an external force.

Figure 23:
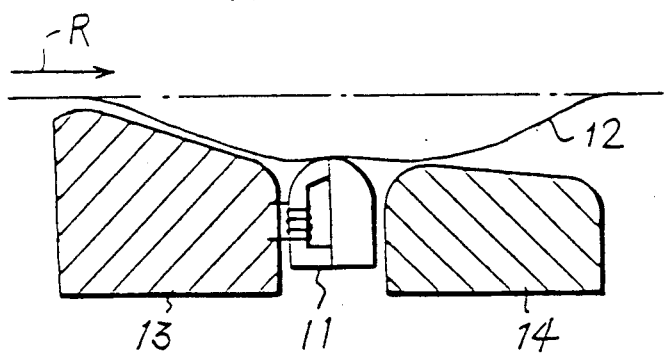
FIG. 23 is a schematic view showing a prior art member.

Inclination angles and areas of the inclined surfaces 24 and 25 can be designed in a variety of ways, including the design of the above-described control members 13 and 14 shown in FIG. 23. The length of the slot 23 is slightly greater than the scanning length of the magnetic head 22, and the width is slightly greater than the width of the magnetic head 22.

At the outer periphery (right rear in FIG. 1) and the inner periphery (left front in FIG. 1) of the slot 23 with respect to the radial direction are provided stabilizing surfaces 26 and 27 continuing from the inclined surfaces 24 and 25. In this embodiment, the stabilizing surfaces 26 and 27 are located on the same plane as the inclined surfaces 24 and 25. Widths and lengths of the stabilizing surfaces 26 and 27 may be determined so as to stabilize the magnetic sheet.

In addition to the control members 13 and 14 shown in FIG. 23, the magnetic sheet control member 21 is provided with the stabilizing surfaces 26 and 27, which continue from the inclined surfaces. When the magnetic sheet control member 21 is used in the recording or reproduction of the magnetic sheet, a negative pressure is generated between the rotary magnetic sheet and the inclined surfaces 24 and 25, and the negative pressure extends to between the stabilizing surfaces 26 and 27 and the magnetic sheet. As a result, the magnetic sheet is attracted to the inclined surfaces 24 and 25, and especially the inner and outer peripheral portions of the magnetic sheet are attracted to the stabilizing surfaces 26 and 27, thus preventing the magnetic sheet from flapping.

Thus, the negative pressure extends to the inner and outer peripheral portions, and stable head contact is obtained over the entire recording area of the magnetic sheet.

In general, the magnitude of negative pressure required for recording and reproduction on an outside track of the magnetic sheet differs from that for an inside track. At the center of the magnetic sheet is provided a center core for mounting the magnetic sheet to the spindle motor of the recording and reproduction device, and the deformation resistance of the magnetic sheet is higher at the inside of the magnetic sheet close to the center core. As a result, a greater negative pressure is required at the inside of the magnetic sheet and, if the magnetic sheet at the outside is attracted by the same negative pressure, the magnetic sheet tends to closely contact the magnetic sheet control member, which may result in an excessive pressure to the magnetic head and generate a rotational resistance.

Figure 3:
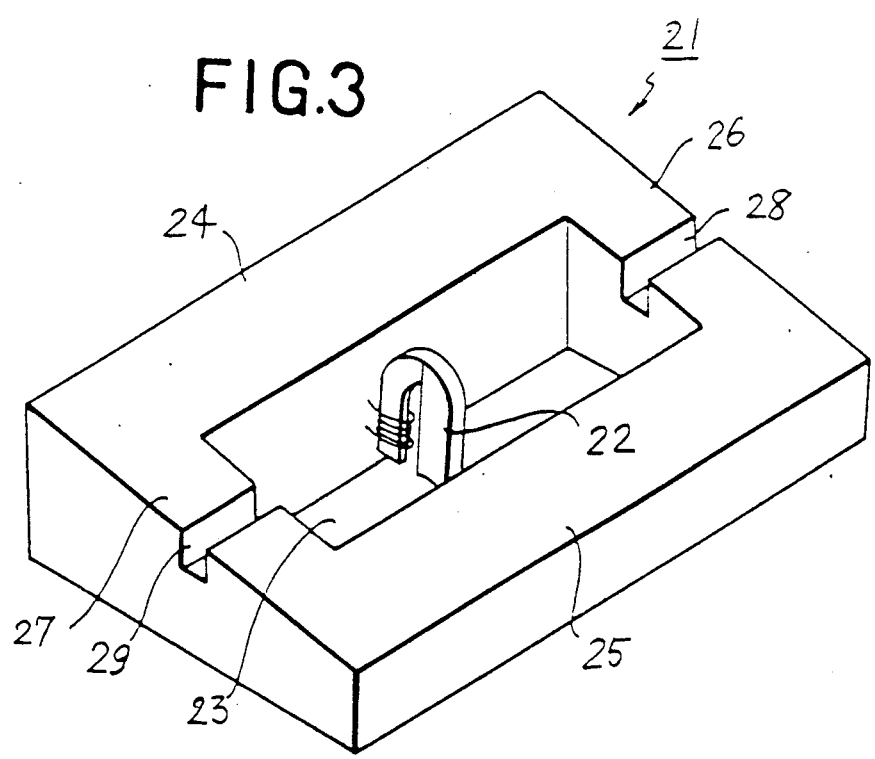
FIG. 3 is a schematic perspective view showing a second embodiment of the present invention.

In such a case, it is preferable to provide grooves 28 and 29 in the stabilizing surfaces 26 and 27 as in the second embodiment shown FIG. 3. These grooves 28 and 29 provide communication between the slot 23 and the exterior in the radial direction to leak part of excessive negative pressure, thereby reducing the load torque.

In the embodiment shown in FIG. 3, other configurations are same as those of the above-described embodiment, the same parts are indicated with the same reference numbers, and description thereof is omitted.

Figure 4:
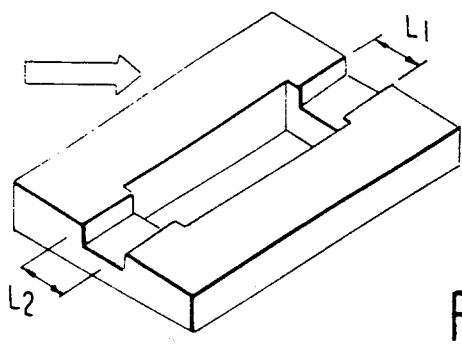
FIG. 4 is a schematic perspective view showing dimensions of the magnetic sheet control member used in experiments.

For the magnetic sheet control member in the above embodiment, experiments were made with different widths $L_1$ and $L_2$ of the grooves 28 and 29. Dimensions of the magnetic sheet control member used in the experiments are shown in FIG. 4. In the experiments, a 2-channel magnetic head was caused to contact the innermost track 50 and the outermost track 1, and conditions to obtain the output were investigated. Specifically, load, ENV, head protrusion, and head position were evaluated. The results are shown in Table 1.

TABLE 1

| | $L_2$ (mm) | | | | | | | | | | | |
|---|---|---|---|---|---|---|---|---|---|---|---|---|
| | 0 | | | | 1 | | | | 2 | | | |
| $L_1$ (mm) | Load | ENV | Head protrusion | Head position | Load | ENV | Head protrusion | Head position | Load | ENV | Head protrusion | Head position |
| 0 | P | G | P | P | G | G-F | P | F | G | G-F | F | G |
| 1 | G | G | G | G | G | G | G | F | G | F | F | G |
| 2 | G | F | G | G | G | G-F | F | G | G | P | G | G |

Figure 5:
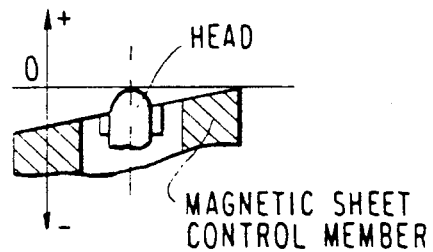
FIG. 5 is a schematic view showing protrusion amount of a magnetic head.
Figure 6:
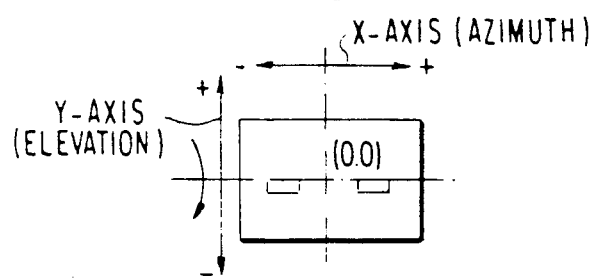
FIG. 6 is a schematic view showing the position of the magnetic head with respect to X- and Y-directions.

Evaluations were made using the following criteria. Since the load is preferably as small as possible, a load torque smaller than 2 g cm on both track 1 and track 50 was evaluated as G (good), and a torque greater than 4 g cm was evaluated as P (poor). For ENV (output), since a smaller ratio of the maximal value and the minimal value is preferable, ENV (MIN/MAX) greater than 0.8 was evaluated as G, a ratio smaller than 0.3 was evaluated as P, and an intermediate value was evaluated as F (fair). Head protrusion was measured as shown in FIG. 5, and a smaller deviation of this value between tracks is preferable. An absolute value of the difference between the track 1 and the track 50 smaller than 5 $\mu$m was evaluated as G, a value greater than 10 $\mu$m was evaluated as P, and an intermediate value was evaluated as F. For head position, it is preferable that deviation of the value between tracks is smaller in both azimuth (X axis) and elevation (Y axis). An absolute value of the difference between the track 1 and the track 50 smaller than 60 μm was evaluated as G, a value greater than 120 μm was evaluated as P, and an intermediate value was evaluated as F.

As can be seen from Table 1, as a total evaluation, the best one has a width $L_1$ of the outer groove 28 of 1 mm and a width $L_1$ of the inner groove 19 of 0 (that is, absence of the groove 29), and the second best one has a combination of widths $L_1$ and $L_2$ of the grooves 28 and 29 of 1 mm and 1 mm, respectively, or a combination of 2 mm and 0 mm. Therefore, it can be seen from the experimental results that the outer groove 28 has greater importance than the inner groove 29.

Figure 7:
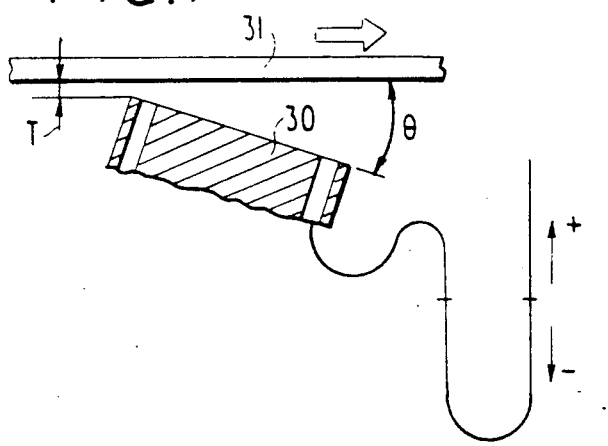
FIG. 7 is a schematic view showing the structure of an experimental system for measuring the distribution of negative pressure.
Figure 8:
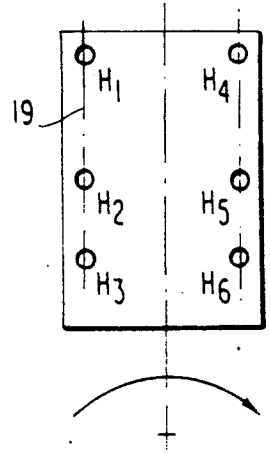
FIG. 8 is a schematic view showing positions of holes in the flat plate-formed magnetic sheet control member shown in FIG. 7.

In order to elucidate the causes for such a difference in importance between the outer and inner grooves 28 and 29, the inventors conducted experiments shown in FIG. 7 and FIG. 8. In these experiments, holes $H_1$–$H_6$ were provided at 6 positions in a flat plate-formed magnetic sheet control member 30, and negative pressures at the individual holes were measured. The results are shown in FIG. 9. As can be seen from FIG. 9, the outer holes $H_1$ and $H_4$ have a stability with smaller changes in negative pressure even if the minimal distance T between a magnetic sheet 31 and the magnetic sheet control member 30 varies, whereas the inner holes $H_3$ and $H_6$ involve greater changes in negative pressure. Since the minimal distance T varies with the mounting condition of the magnetic sheet 31, negative pressure at the inside of the magnetic sheet is unstable compared to the outside, which may lead to flapping. Therefore, flapping can be suppressed by maintaining a sufficient pressure without using the inner grove 29, but the presence of the outer groove is preferable because it can leak part of negative pressure to reduce the load torque.

Figure 10:
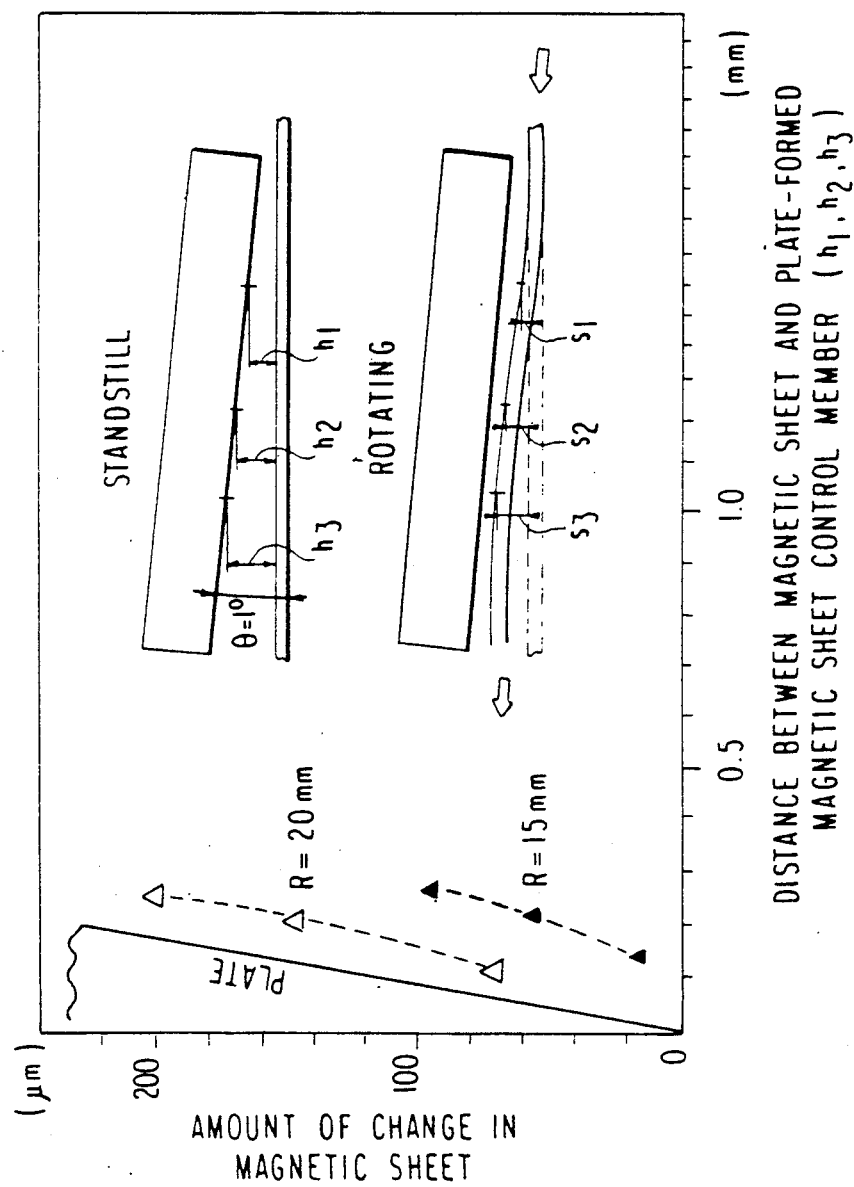
FIG. 10 is a graph showing changes of the magnetic sheet due to negative pressure.

Furthermore, the inventors have investigated differences in amounts of deformation of the magnetic sheet between the position of a 15 mm radius (corresponding to track 50) and that of a 20 mm radius (corresponding to track 1). The results are shown in FIG. 10. FIG. 10 shows relationship between deformation amounts $S_1$, $S_2$, and $S_3$ during rotation and distances $h_1$, $h_2$, and $h_3$ which are distances of points on the magnetic sheet from the magnetic sheet control member in the stationary state of the magnetic sheet. As can be seen from the results, since deformation amounts are greater in the outer position, it is preferable to provide a groove 28 at the outer side to leak part of the negative pressure, thereby preventing contact of the magnetic sheet with the magnetic sheet control member.

Figure 11:
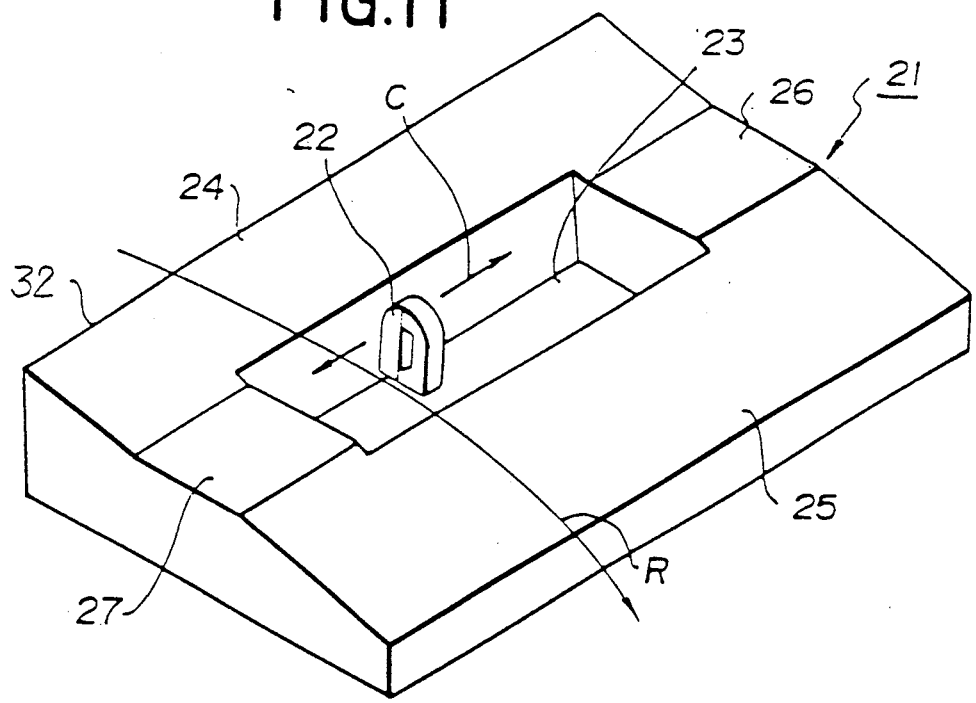
FIG. 11 is a schematic perspective view showing a third embodiment of the present invention.
Figure 12:
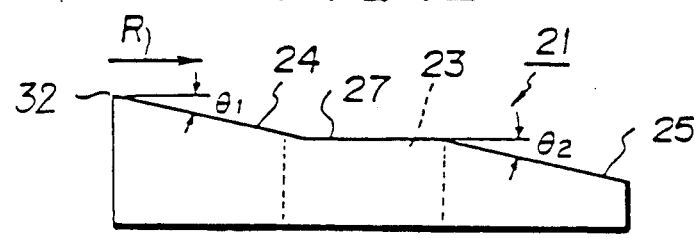
FIG. 12 is a schematic side view of the third embodiment.

A third embodiment of the present invention will now be described with reference to FIG. 11 and FIG. 12. In this embodiment, the stabilizing surfaces of the magnetic sheet control member are parallel to a free rotary surface N of the magnetic sheet. Specifically, stabilizing surfaces 26 and 27 which are parallel to the free rotary surface N of the magnetic sheet are formed respectively at the outer side and the inner side of a slot 23 with respect to the radial direction of the magnetic sheet, and individual outer side end and the inner side end of inclined surface 24 and 25 are connected by these stabilizing surfaces 26 and 27. Other configurations are same as in the embodiment shown in FIG. 1.

Inclination angles $\theta_1$ and $\theta_2$ of the inclined surfaces 24 and 25 are preferably 1° to 3°, and the upstream-side inclination angle $\theta_1$ of the upstream-side inclined surface 24 may be slightly greater than the $\theta_2$ of the downstream-side inclined surface 25. In experiments, it has been found that, in a magnetic sheet recording and reproduction device for recording and reproduction of a 2-inch video floppy disc rotated at 3,600 rpm, inclination angles $\theta_1$ and $\theta_2$ are most preferably 1.2°.

Radius of curvature in the range of an upstream-side edge 32, that is the closest edge to the magnetic sheet, of the upstream-side inclined surface 24 is preferably 0.05 to 0.5 mm. A smaller radius of curvature in the range of the edge than the range tends to result in generation of an excessive negative pressure at the edge, which acts as a rotational resistance of the magnetic sheet, leading to an increase in load torque of the spindle motor to drive the magnetic sheet. If the radius is greater than the range, it will be difficult to obtain a necessary negative pressure at the edge. According to experiments, an edge radius of curvature in the range of 0.09 mm has been found to be most preferable in view of the load torque and the negative pressure.

Figure 13:
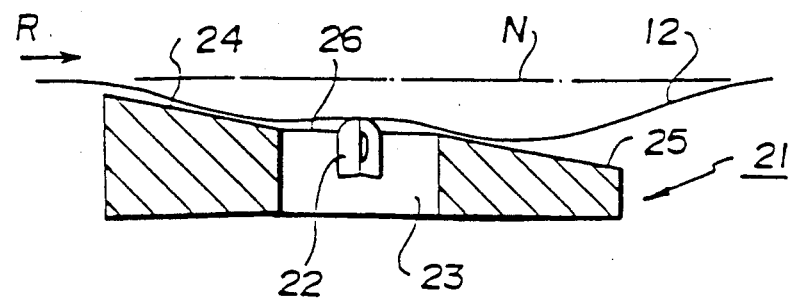
FIG. 13 is a schematic cross sectional view showing functions of the third embodiment.

With the magnetic sheet control member 21, referring to FIG. 13, negative pressures are generated on the inclined surfaces 24 and 25 by air flow in association with rotation of the magnetic sheet 12, and the magnetic sheet 12 is attracted towards the magnetic head 22 side. Since the outside and inside ends of the inclined surfaces 24 and 25 are closed by the stabilizing surfaces 26 and 27, as in the above-described embodiments, leakage of the negative pressure is prevented and flapping of the outside and inside portions of the magnetic sheet 12 is prevented, thereby stabilizing the magnetic sheet 12 along the stabilizing surfaces 26 and 27. In this embodiment, the stabilizing surfaces 26 and 27 are parallel to the free rotary surface N of the magnetic sheet 12, the magnetic sheet 12 which covers the slot 123 of the magnetic sheet control member 21 is positioned substantially parallel to the free rotary surface N. Thus, satisfactory recording and reproduction can be made by positioning the magnetic head 22 perpendicular to the free rotary surface N.

Figure 14:
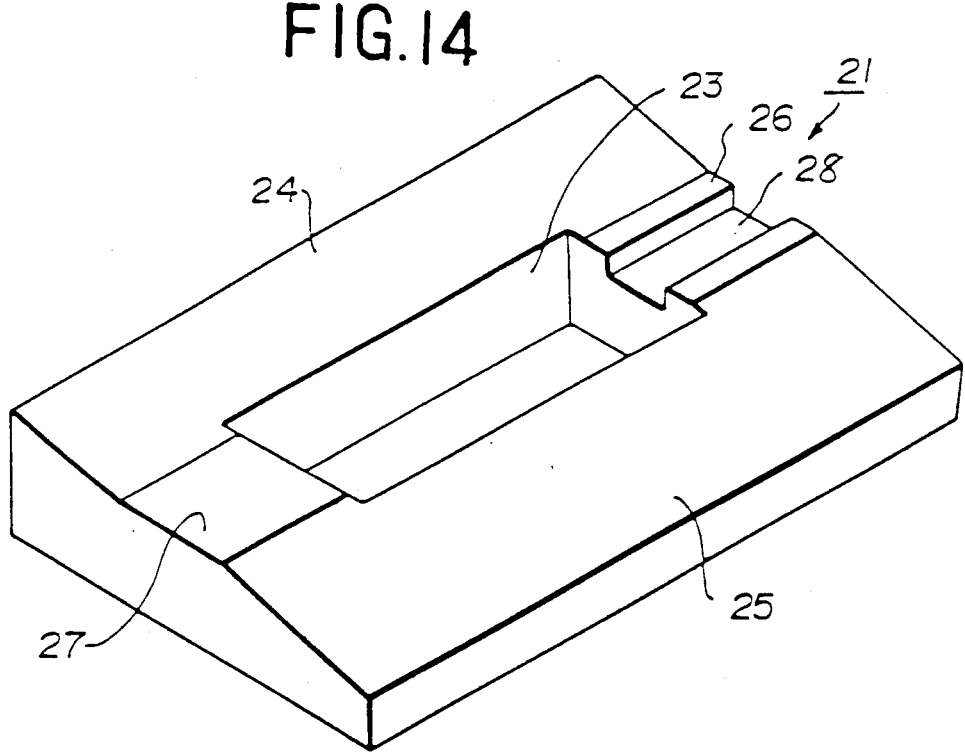
FIG. 14 and FIG. 15 are schematic perspective views respectively showing a fourth embodiment and a fifth embodiment of the present invention.
Figure 15:
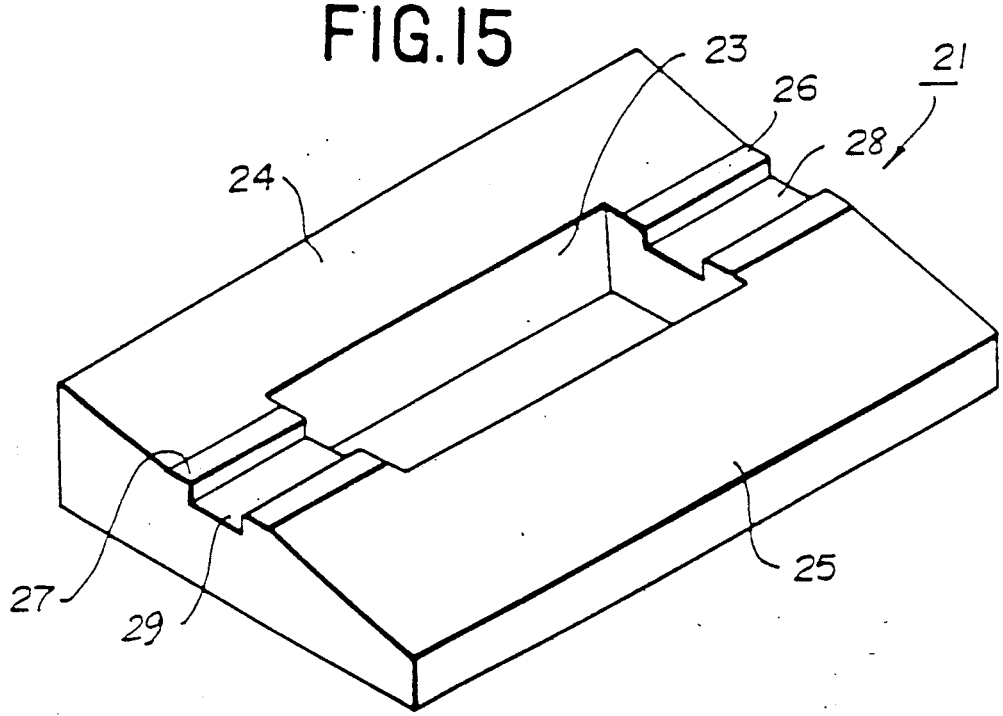

FIG. 14 and FIG. 15 are individually perspective views of fourth and fifth embodiments of the magnetic sheet control member according to the present invention. In these embodiments, as in the above-described embodiments, the stabilizing surfaces 26 and 27 are provided with grooves to adjust the amounts of negative pressure.

In the embodiment shown in FIG. 14, the outer stabilizing surface 26 is provided with a groove 28, thereby communicating the slot 23 with the outside. With this configuration, air is introduced through the groove 28 to relax negative pressure at the outside. in the embodiment shown in FIG. 15, on the other hand, in addition to the outer stabilizing surface 26, the inner stabilizing surface 27 is also provided with a groove 29, of which the width is smaller than that of the outer groove 28. With such adjustment of widths of the grooves 28 and 29, amounts of introduced air can be controlled to obtained optimal negative pressures for individual portions.

Figure 16:
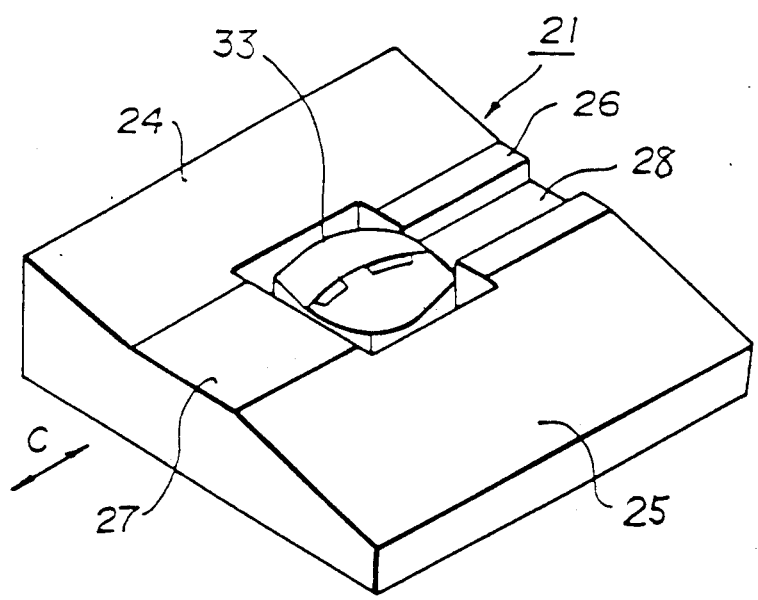
FIG. 16 is a schematic perspective view showing a sixth embodiment of the present invention.

FIG. 16 is a schematic perspective view showing a sixth embodiment of the magnetic sheet control member according to the present invention, shown together with the magnetic head. The above-described embodiments are examples of stabilizing plates of a type fixed to the frame of the recording and reproduction device, however, the present invention can also be applied to a magnetic sheet control member of a type which moves together with the magnetic head. One which is shown in FIG. 16 is a moving type stabilizing plate, in which a magnetic head 33 is positioned at the central hole of the magnetic sheet control member 21, and the magnetic sheet control member 21 itself is mounted to a head carriage supporting the magnetic head 33.

Figure 17:
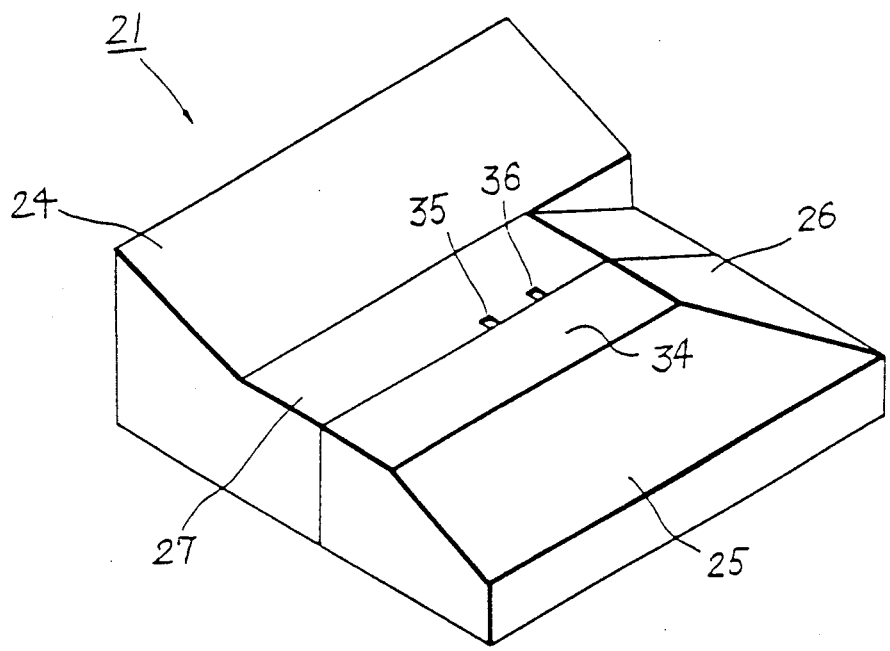
FIG. 17 and FIG. 18 are schematic perspective views respectively showing a seventh embodiment and a eighth embodiment of the present invention.
Figure 18:
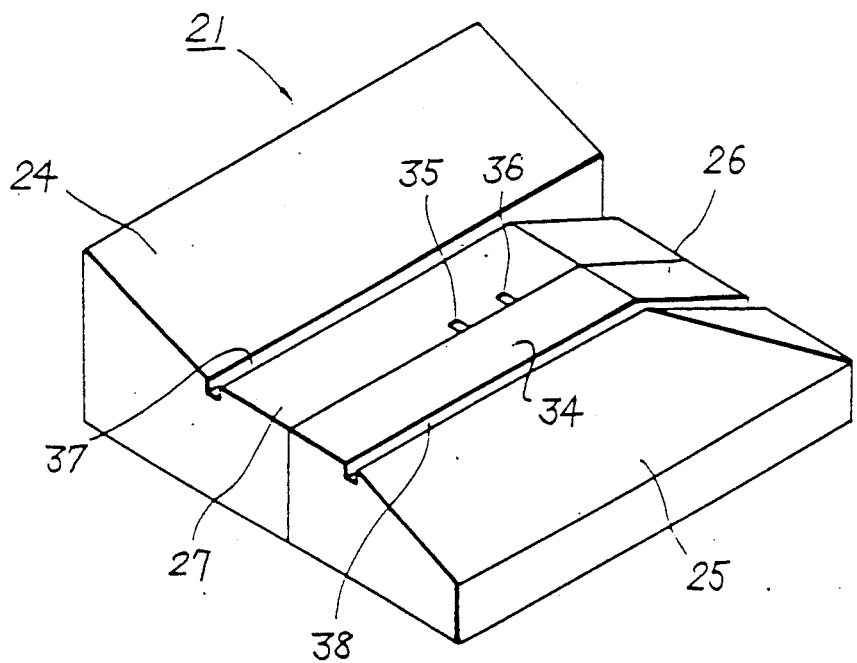

FIG. 17 and FIG. 18 respectively show seventh and eighth embodiments of the present invention, in which magnetic sheet control members are each integrally combined with the magnetic head, and the outer stabilizing surface is inclined so that the surface becomes more distant from the magnetic sheet towards the outside.

The magnetic sheet control member 21 shown in FIG. 17 is of a nearly square flat-plate form measuring 3×3 mm to 7×7 mm. The magnetic sheet control member 21, as in the sixth embodiment, has the upstream-side inclined surface 24 and the downstream-side inclined surface 25, which are connected by the inner stabilizing surface 27 parallel to the free rotary surface N of the magnetic sheet.

The inner stabilizing surface 27 form a flat surface continuing to a flat portion 34 at the center of the magnetic sheet control member 21, and magnetic heads 35 and 36 are integrally embedded in the flat portion 34.

The outer stabilizing surface 26 is inclined so that it becomes more distant from the magnetic sheet towards the outer side in the radial direction of the magnetic sheet. Inclination angle and area of the inclined surface may be determined according to the direction and speed of air flow generated in association with rotation of the magnetic sheet and other conditions. Air flow generated in association with rotation of the magnetic sheet contains a greater proportion of circumferential component, but also contains a radial component which becomes greater towards the outer side in the radial direction. Therefore, in the outer peripheral portion of the magnetic sheet, the radial component of the air flow may become greater than the circumferential component. Thus, a greater negative pressure can be generated by guiding the air flow towards the radial outside by the function of inclination of the outer stabilizing surface 26 than by guiding the air flow in the circumferential direction. However, since the effect varies with the relation between the air flow and the inclined surface 16, the inclination angle and area of the stabilizing surface 26 may be experimentally determined.

In the recording and reproduction operation using the magnetic sheet control member 21, air flow generated in association of rotation of the magnetic sheet is guided by the inclined surfaces 24 and 25 in the circumferential direction to generate a negative pressure. The outer peripheral portion of the air flow, which which contains a greater proportion of radial component, is guided by the outer stabilizing surface 26 in the radial direction to generate a negative pressure. As a result, the magnetic sheet is attracted towards the magnetic heads 35 and 36 to provide good head contact over the entire recording area. This effect is particularly large when the magnetic heads 35 and 36 are moved to the outermost or innermost track for recording and reproduction, thereby preventing the magnetic sheet from flapping.

This embodiment, in which the magnetic heads 35 and 36 are integrally embedded in the magnetic sheet control member 21, can eliminate the need for subsequent fine adjustment because the relative positions of the magnetic head 35 and 36 and the magnetic sheet control member 21 are previously determined, thereby achieving a reduction in adjusting time. The recording surface of the magnetic sheet may be damaged if insufficiently adjusted, but the configuration of this embodiment can eliminate such a problem.

As described above, this embodiment of the magnetic sheet control member guides the air flow generated in association with rotation of the magnetic sheet not only in the circumferential direction, but also efficiently guides it in the radial direction to increase the negative pressure. However, if the negative pressure is excessive, it has a possibility to increase the rotational resistance of the magnetic sheet. In such a case, as in the eighth embodiment of the present invention shown in FIG. 18, grooves 37 and 38 can be provided between the stabilizing surface 27 and the flat portion 34 and the inclined surfaces 24 and 25 to leak part of the excessive negative pressure, thereby avoiding increase in the rotational resistance. In the eighth embodiment shown in FIG. 18, other configurations are same as those of the embodiment shown in FIG. 18 and description thereof is omitted.

In the above-described magnetic sheet control member, it is necessary to set the relative positions of the magnetic head and the magnetic sheet very precisely. For example, if the magnetic sheet control member is too distant from the magnetic sheet, a sufficient negative pressure cannot be obtained. On the other hand, if the magnetic sheet control member is too close to the magnetic sheet, the recording surface of the magnetic sheet can be scratched by the magnetic sheet control member. However, in the prior art devices, since the magnetic sheet control member is mounted at a predetermined position using a mounting piece and fixed with an adhesive, there may occur mounting errors due to differences between parts, which makes it difficult to control the amount of negative pressure.

To solve such a prior art problem, the inventors have allowed the magnetic sheet control member to be mounted to a carrier to support the member via an adjusting mechanism to adjust the relative position to the magnetic head. In addition, it has been proposed that the magnetic sheet control member is formed as a double structure having an inner member positioned close to the magnetic head and an outer member positioned distant from the magnetic head, so that the relative positions of the inner and outer members are made adjustable, thereby adjusting the amount of negative pressure.

Embodiments of the present invention will now be described with reference to the drawings.

Figure 19:
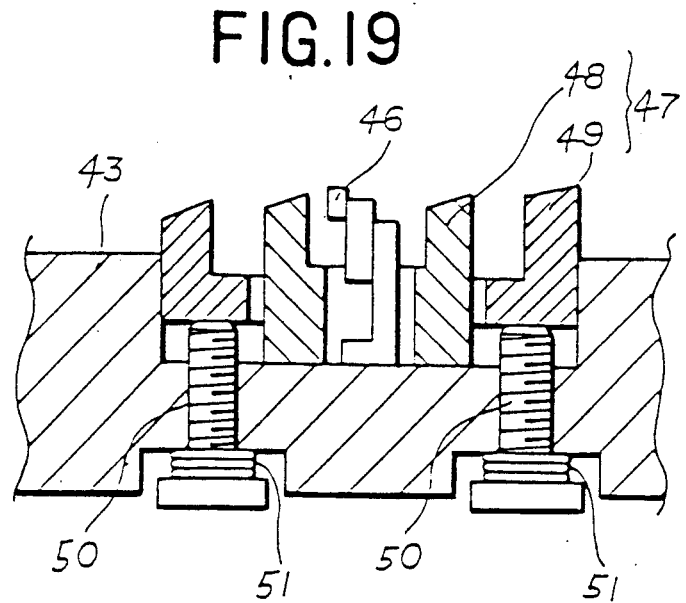
FIG. 19 is a schematic cross sectional view showing part of another embodiment of the present invention (taken along line XIX—XIX in FIG. 20.
Figure 20:
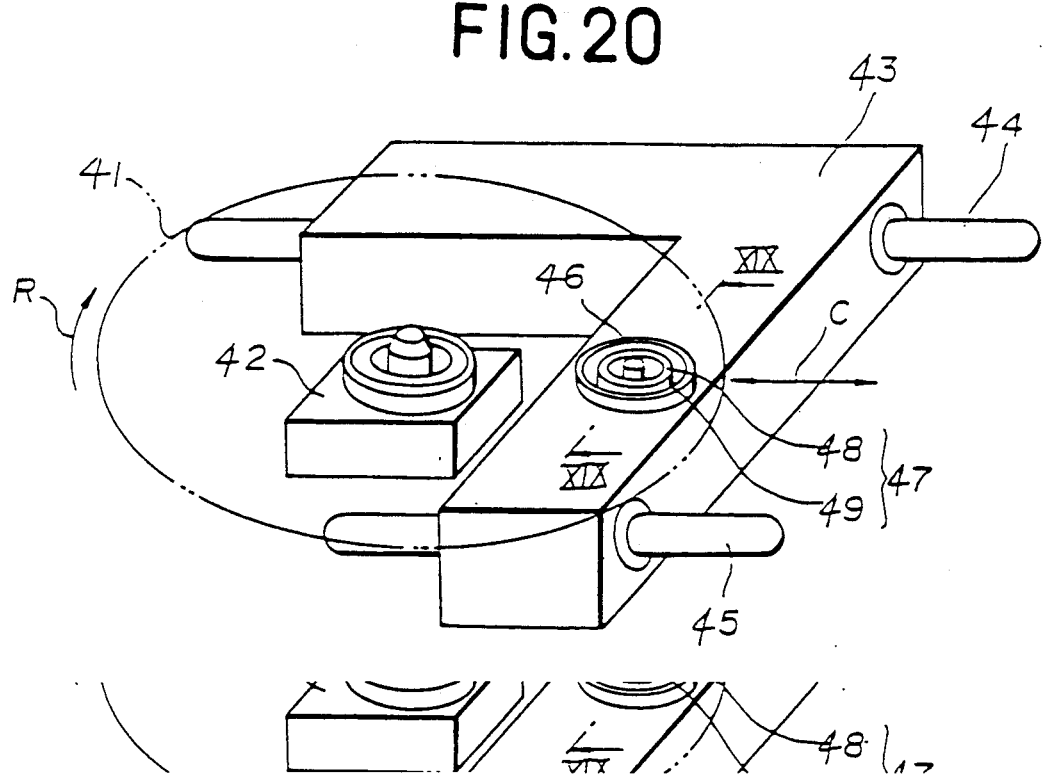
FIG. 20 is a schematic perspective view showing the structure of the embodiment.

FIG. 19 is a schematic cross-sectional view showing part of an embodiment of the present invention (cross-sectional view taken along line XIX—XIX in FIG. 20), and FIG. 20 is a schematic perspective view showing the entire structure of the embodiment.

Referring to FIG. 20, in this recording and reproduction device, a spindle motor drive a magnetic sheet 41 is mounted to a frame (not shown). In the vicinity of the spindle motor 42, a head carriage 43 is slidably supported by two guide bars 44 and 45 which are fixed to the frame, and a magnetic head 46 is mounted on the head carriage 43. The head carriage 43 is driven by a drive unit (not shown) to move along the guide bars 44 and 45, thereby positioning the magnetic head 46 in the radial direction (arrow C) of the magnetic sheet 41 attached to the spindle motor 42.

The magnetic sheet 41 attached to the spindle motor 42 is rotated by the spindle motor 42 at a high speed in the direction of the arrow R, and the magnetic head 46 comes in sliding contact with the magnetic head to make recording and reproduction on the magnetic sheet 41. Recording or reproduction track on the magnetic sheet 41 is changed by moving the magnetic head 46 in the radial direction of the magnetic sheet 41.

In order to maintain the magnetic sheet 41 in good contact with the magnetic head 46, There is provided a magnetic sheet control member 47 surrounding the magnetic head 46. In this embodiment, the magnetic sheet control member 47 has a double structure comprising an inner member 48 and an outer member 49, both having circular plan views, and the magnetic head 46 is disposed at the center of the magnetic sheet control member 47.

As shown in FIG. 19, the magnetic head 46 is mounted to the head carriage 43, and the inner member 48 is disposed in the vicinity of the magnetic head 46 at its outer periphery and is also mounted to the head carriage 43. The outer member 49 is disposed at the outer periphery of the inner member 48, and the outer member 49 is mounted to the head carriage 43 slidably in the approaching/separating direction (up/down direction in FIG. 19) relative to the magnetic sheet 41. The head carriage 43 is provided with a plurality of screw holes penetrating across the upper and lower faces, into which are screwed adjusting screws 50 from the lower face, and ends of the individual adjusting screws 50 come in contact with the lower face of the outer member 49. These adjusting screws 50 are wound around with compression coil springs 51 to remove plays.

Therefore, when the adjusting screws 50 are rotated to vary their amounts of protrusion, the outer member 49 vertically moves to vary the relative positions of the magnetic head 46 and the inner member 48. When the plurality of adjusting screws 50 are adjusted in different protrusion amounts from one another, the outer member 49 can be inclined in a desired direction.

With the recording and reproduction device of this configuration, the overall amount of negative pressure generated by the inner member 48 and the outer member 49 is varied by adjusting the adjusting screws 50 to move the outer member 49, thereby easily obtaining a correct head contact. This adjustment is performed mainly in the stage of assembly and, after adjusted, the outer member 49 is fixed to the head carriage 43 with an adhesive.

Figure 21:
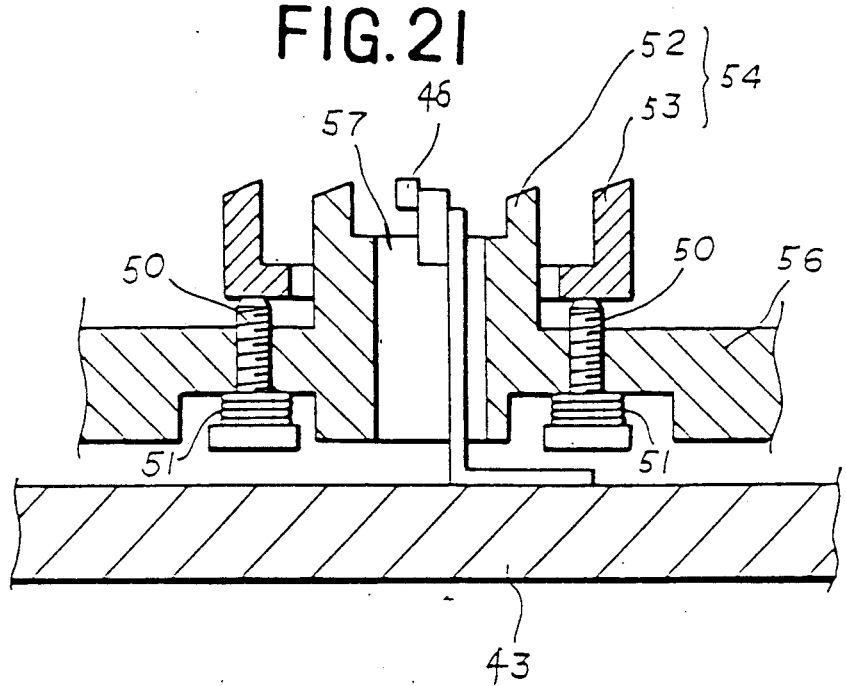
FIG. 21 is a schematic cross sectional view showing part of another embodiment of the present invention (taken along line XXI—XXI).
Figure 22:
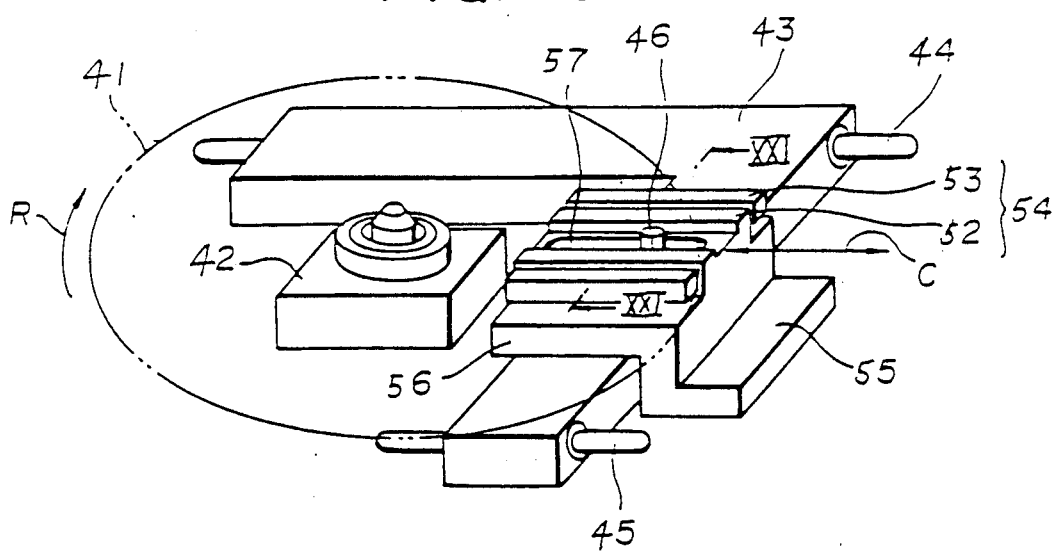
FIG. 22 is a schematic perspective view showing the entire structure of the embodiment.

FIG. 21 is a schematic cross-sectional view (taken along line XXI—XXI in FIG. 22) showing part of another embodiment of the present invention, and FIG. 22 is a schematic perspective view showing its entire structure. Whereas the magnetic sheet control member of the above-described embodiment is of a moving type which moves with the magnetic head, this embodiment is an example applied to a type in which the magnetic sheet control member is fixed to a frame. Same members as used in the above-described embodiment are indicated with the same reference numbers and description thereof is omitted.

As shown in FIG. 21 and FIG. 22, in this embodiment, a magnetic sheet control member 54 comprises an inner member 52 and the outer member 53 respectively disposed at the upstream side and the downstream side of the magnetic head 46 with respect to the rotational direction R of the magnetic sheet 41. The magnetic sheet control member 54 is supported by a supporting table 55 mounted to a frame (not shown), and is isolated from movement of the head carriage 43.

The supporting member 55 has a protrusion 56 protruding upward above the head carriage 43, and at the center of the protrusion 56 is provided a through slot 57 along the radial direction of the magnetic sheet 41. As shown in FIG. 19, the magnetic head 46 is fixed to the head carriage 43 and its front end passes through the slot 57 up to above the protrusion 56. The inner member 52 of the magnetic sheet control member 54 is disposed in the vicinity of and at the upstream and downstream sides of the magnetic head 46 and is formed integrally with the protrusion 56. The outer member 53 is disposed at the outside of the inner member 52. The outer member 53 can be moved in the direction to approach and become distant from the magnetic sheet 41 (vertical direction in FIG. 19), and adjusting screws 50 engaging with the protrusion 56 engage with the outer member 53, as in the above embodiment.

Thus, in this embodiment, the outer member 53 is moved by rotating the adjusting screws 50 to vary its position relative to the inner member 52, thereby adjusting the overall amount of negative pressure generated by the magnetic sheet control member 54.

In the above-described embodiments, the magnetic sheet control member comprises the inner member and the outer member and the outer member is adjustable. However, it may alternatively configured so that the inner member is adjustable. The adjusting screw mechanism as an adjusting mechanism may be replaced with, for example, a mechanism to insert and remove shims. Furthermore, in the inventive recording and reproduction device, alternatively, a single stabilizing plate may be adjusted, rather than using the double-structured stabilizing plate.

We claim:

1. A magnetic sheet control member, used in a recording and reproduction device for magnetic recording and reproduction using a magnetic head in sliding contact with a flexible magnetic sheet rotating about a center point and defining in a radial direction from the center point a free rotary surface plane, to deflect said magnetic sheet from said free rotary surface plane into close contact with said magnetic head by a negative pressure, said control member having a slot disposed at a center portion thereof, said magnetic head being inserted in said slot, comprising:

a body having an upstream-side inclined surface and a downstream-side inclined surface disposed, respectively, at an upstream side and a downstream side with respect to the rotational direction of said magnetic sheet, said inclined surfaces being inclined to become more distant from the free rotary surface plane of said magnetic sheet towards their downstream side, and stabilizing surfaces disposed respectively at an outer side and an inner side of said body with respect to the radial direction of said magnetic sheet to connect said upstream-side inclined surface and said downstream-side inclined surface to form said slot.

2. The magnetic sheet control member as claimed in claim 1 wherein a groove is provided in at least said stabilizing surface disposed at the outer side of said body.

3. The magnetic sheet control member as claimed in claim 1 wherein at least one of said stabilizing surfaces comprises a flat surface joining said upstream-side inclined surface and said downstream-side inclined surface.

4. The magnetic sheet control member as claimed in claim 1 wherein said stabilizing surfaces are parallel to said free rotary surface plane of said magnetic sheet.

5. The magnetic sheet control member as claimed in claim 1 wherein said stabilizing surface disposed at the outer side of said magnetic sheet is inclined to become more distant from said magnetic sheet towards the outer side of said magnetic sheet.

6. The magnetic sheet control member as claimed in claim 5 wherein grooves extending in the radial direction are provided at a downstream end of said upstream-side inclined surface and at an upstream end of said downstream-side inclined surface.

7. The magnetic sheet control member as claimed in claim 1 wherein said magnetic head being movable in the radial direction.

8. The magnetic sheet control member as claimed in claim 1 wherein an edge of said upstream-side inclined surface in close vicinity to said magnetic sheet has a radius of curvature in the range of 0.05 mm to 0.5 mm.

9. The magnetic sheet control member as claimed in claim 1 wherein a portion of said body containing at least one of said inner and outer side stabilizing surfaces is adjustable.

10. The magnetic sheet control member as claimed in claim 1 wherein said body is mountable to a head carriage.

11. The magnetic sheet control member as claimed in claim 1 wherein said body further comprises means for releasing negative pressure between said control member and said magnetic sheet.

12. The magnetic sheet control member as claimed in claim 1 wherein said upstream-side inclined surface is inclined relative to said free rotary surface plane at an angle $\theta_1$ within the range 1°–3°, and said downstream side inclined surface is inclined relative to said free rotary surface plane at an angle $\theta_2$ between 1° and 3°, and wherein $\theta_1$ is slightly greater than $\theta_2$.

* * * * *